Patented Feb. 2, 1937

2,069,209

UNITED STATES PATENT OFFICE 2,069,209

DYESTUFF PASTE FOR USE IN PRINTING

George M. Bishop, Buffalo, N. Y., assignor to National Aniline & Chemical Company, Inc., New York, N. Y., a corporation of New York No Drawing. Application November 7, 1929, Serial No. 405,532

11 Claims. (Cl. 8—6)

The present invention relates to vat dyestuff pastes and a process for the production thereof, particularly to vat dyestuff pastes of the indigoid and the anthraquinone types, and to the use of the same in printing.

Dyestuffs, particularly vat dyes, for use in printing, appear in commerce usually as aqueous pastes composed of the insoluble dyestuff in a dispersed condition, and of other ingredients such as thinning and/or dispersing agents. In printing with vat dyestuffs on textile fibres, the dyestuff is applied to the fibre as a printing paste containing the unreduced color in a dispersed state, a reducing agent, an alkali, a thickener, and other ingredients employed as assistants in the operation. Since the unreduced dyestuff has little or no affinity for the fibre, the prints are subjected to a steaming operation wherein the dyestuff is reduced to the leuco-form, in which condition it penetrates the fibre. To fix the color in or on the fibre, the prints are exposed to the air, or other oxidizing agent, whereby the leuco-dyestuff is oxidized to the original insoluble dyestuff.

The dyeing of textiles by printing is generally accomplished under considerable difficulties. The dyestuff pastes, as they appear on the market, are liable to dry out after the container is opened, even when precautions are taken to prevent evaporation of water therefrom. The drying out of the dyestuff pastes in storage results in the production of lumps in the paste which are not readily dispersed when the printing paste is made therefrom. The presence of lumps in the printing paste results in specky prints, and is therefore highly objectionable. Poor reduction of the dyestuff during the steaming operation often causes poor prints, for the unreduced dyestuff, having practically no affinity for the fibre, washes off in the subsequent operations of washing and soaping which also removes the assistants. By having the dyestuff in the printing paste in a highly dispersed form the reduction of the dyestuff during the short steaming operation is facilitated.

The present invention has for one of its objects the production of a vat dyestuff paste or printing paste in which the dyestuff is highly dispersed and which yields uniform prints free from speckiness. A further object is the production of a dyestuff paste or printing paste of vat dyes in which the dyestuff is readily reducible by the common reducing agents used in printing. A further object is to secure sharply outlined prints, a better penetration of the leuco dyestuff into the fibre, and a more complete utilization of the dye. Still another object is the production of a vat dyestuff paste which is relatively stable and which does not dry out or thicken or readily form lumps on exposure to the air. These and other objects, as will be apparent from a consideration of the specification, are accomplished in the practice of the invention.

According to the present invention, a vat dyestuff paste is formed by incorporating with a vat dyestuff in the presence of a dispersing agent and such other ingredients as are normally employed in making dye pastes, an assistant which comprises a hydroxyalkyl ether, particularly a di-(hydroxyalkyl) ether, more especially the di-(hydroxyalkyl) mono-ethers, for example, diethylene glycol ($HO.CH_2.CH_2.O.CH_2.CH_2.OH$), dipropylene glycol $$(HO.CH_2.CH_2.CH_2.O.CH_2.CH_2.CH_2.OH),$$

dibutylene glycol ($HO.(CH_2)_4.O.(CH_2)_4.OH$) etc. Prints made from printing pastes in which the above assistants are employed are conspicuous for the brightness of the shade, strength, and penetration of the color, absence of specks in the printed portion and clearness of outline and even distribution of color in the design. I have further found that a vat dyestuff paste which contains a hydroxyalkyl ether does not dry out upon standing in the open air. The composition of such a paste, when exposed to the air, will vary only with the relative humidity of the air, and, therefore, may be kept for a considerable time without great precautions against evaporation of moisture.

The invention will be exemplified in the following examples: The parts are by weight.

*Example 1. Dyestuff paste.*—To 400 parts of National Carbanthrene Dark Blue DR paste, (Color Index No. 1099) containing about 25% solids, 1.2 parts of Leukanol (as a dispersing agent) the liquid phase being essentially water, 240 parts of diethylene glycol (beta-beta'-dihydroxy-diethyl-ether) are added. The mixture is evaporated with constant agitation to a weight of about 400 parts. A dye paste is thus obtained which contains together with the dyestuff, approximately 1 part of water to 4 parts diethylene glycol. The water originally present in the paste has been in major part replaced by the diethylene glycol.

The resulting paste does not dry out upon standing. Comparative tests with it and an ordinary paste composed of dyestuff, dispersing agent and water, showed that upon exposure to the air for 18 days, the ordinary paste lost 76.3 per cent. of its original weight, while the new paste lost only 7.1 per cent. of its original weight. Further the new paste will not freeze at any temperature encountered in winter weather. Similar comparative tests with pastes containing National Carbanthrene Blue GCD Double Paste, (Color Index No. 1113) and with pastes containing National Carbanthrene Violet RR Paste (Color Index No. 1104) showed comparable results. Instead of Leukanol, other dispersing agents, e. g., Binderine, etc., may be used. Other vat dyestuffs for example, Flavanthrone (Color Index No. 1118), Pyranthrone, (Color Index No. 1096), Indanthrone (Color Index No. 1106), Indanthrene Green B (Color Index No. 1102), etc., may be converted in a similar or analogous manner into pastes containing a hydroxyalkyl ether. In general, anthraquinone vat dyestuffs give good results.

Example 2. Printing Paste.—20 parts of a National Carbanthrene Dark Blue DR Paste, prepared by following the procedure set forth in above Example 1 for the preparation of a dye paste, are mixed with 20 parts British gum powder and 61 parts of water. 17 parts potassium carbonate are added and the mixture is heated to about 170° F. until the potassium carbonate and gum are dissolved. The mixture is then cooled to about 140° F. at which temperature 10 parts sodium sulfoxylate-formaldehyde is added. 128 parts of printing paste is thus produced.

The fibres or fabrics upon which the printing pastes of the present invention have been applied, have imprinted thereon, before reduction of the dyestuff to the leuco form by steaming, a paste comprising the vat dyestuff and the hydroxyalkyl ethers, as well as such other assistants as may be employed. In the subsequent operations of washing and soaping, the hydroxyalkyl ether and other assistants are removed.

Prints prepared from the above printing paste show better penetration, sharper outline and increased strength and brightness of color over prints made with pastes which do not contain the new assistant. There is also less loss of dyestuff, since a greater portion of the dyestuff in the paste deposited on the fibre is reduced and penetrates the fibre.

The improved results secured by the use of the new assistants may be due to two factors. It is possible that because of its hygroscopic nature, the presence of the hydroxyalkyl ether in the printed pattern prevents the print from becoming too dry before steaming or ageing. It is also possible that the hydroxyalkyl ether increases the solubility of the leuco-compound of the vat dyestuff, and thereby improves the penetration into the fibre and brings about better fixation, resulting in decreased losses of vat dyestuff during the subsequent operations of washing and soaping. However, I do not wish to be limited to the above theory in claiming my invention.

The desirable effects of the presence of a hydroxyalkyl ether in pastes vary in degree according to the proportion or amount which is present in the paste. In the above Example 1, I have disclosed a paste containing the preferred proportion of diethylene glycol, namely, about 4 parts diethylene glycol to one part of water, which ordinarily will be found advantageous, but it is to be understood that the proportions may be varied. However, when a paste containing a higher ratio of diethylene glycol is permitted to stand in contact with the air, it absorbs moisture until an equilibrium is reached at which point the paste will contain approximately four parts of diethylene glycol to one part of water. When lower proportions of diethylene glycol are present in the paste, it loses water until the point of equilibrium is reached. It will thus be seen that the water content of the pastes prepared according to the invention reaches a state of equilibrium when the pastes are exposed to the atmosphere, the water content remaining approximately constant after equilibrium has been reached. It is also obvious that the advantages of changed proportions should be balanced against the accompanying disadvantages to meet particular situations.

The amount of dyestuff in the paste may be varied from the compositions above described in order to produce dyeings of different strengths, as is well understood in the art. Also, it will be understood that the invention is not limited with respect to other ingredients which may be used in the pastes along with the diethylene glycol and dyestuff, and that the pastes may be compounded in any other convenient manner. The invention, furthermore, comprises fabrics and other materials printed with the dye pastes prepared by the process above set forth.

It will be further understood that the following claims are intended to cover all of the generic and specific features of the invention herein described and all statements of the scope of the invention which, as a matter of language, might be said to fall therebetween.

I claim:

1. As a composition of matter, a dyestuff paste comprising a dibenzanthrone dyestuff and a hydroxyalkyl ether.

2. As a composition of matter, a dyestuff paste comprising a dibenzanthrone dyestuff and a di-(hydroxyalkyl) ether.

3. As a composition of matter, a dyestuff paste comprising approximately 1 part of water to 4 parts of diethylene glycol, and a dibenzanthrone dyestuff.

4. As a composition of matter, a dyestuff paste comprising a dibenzanthrone dyestuff and a di-(hydroxyalkyl) mono-ether.

5. As a composition of matter, a dyestuff paste comprising dibenzanthrone and diethylene glycol.

6. A process of printing fabrics, which comprises applying thereto a printing paste comprising a dibenzanthrone dyestuff and diethylene glycol.

7. As a new composition of matter, a dyestuff paste comprising a dibenzanthrone dyestuff in paste form and beta-beta'-dihydroxy-diethyl-ether.

8. As a new composition of matter, a dyestuff paste comprising a dibenzanthrone dyestuff in paste form, beta-beta'-dihydroxy-diethyl-ether and a dispersing agent.

9. As a composition of matter, a dyestuff paste comprising a hydroxyalkyl ether, a dibenzanthrone dyestuff and a dispersing agent.

10. As a composition of matter, a dyestuff paste comprising dibenzanthrone and a di-(hydroxyalkyl) mono-ether.

11. A process of printing fabrics, which comprises applying thereto a printing paste comprising a dibenzanthrone dyestuff and a hydroxyalkyl ether.

GEORGE M. BISHOP.